Dec. 27, 1960
D. H. MENZEL
2,966,381
HIGH TEMPERATURE BEARING AND THE LIKE
Filed Jan. 9, 1958
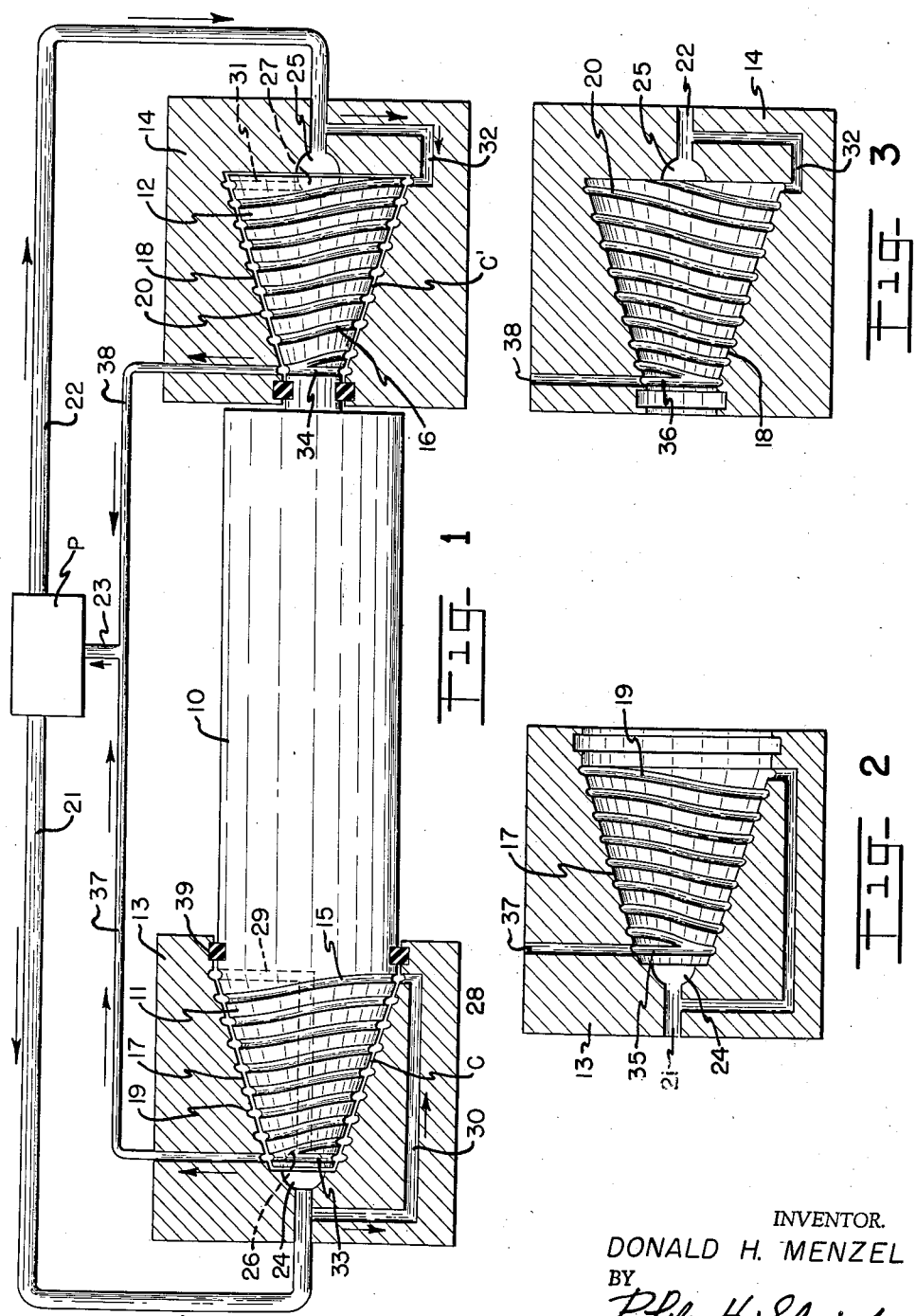
INVENTOR.
DONALD H. MENZEL
BY
Philip H. Sheridan
ATTORNEY

United States Patent Office 2,966,381
Patented Dec. 27, 1960

2,966,381

HIGH TEMPERATURE BEARING AND THE LIKE

Donald H. Menzel, 32 Hubbard Park, Cambridge, Mass.

Filed Jan. 9, 1958, Ser. No. 708,009

7 Claims. (Cl. 308—77)

This invention relates to bearings and more specifically to bearings for use in high temperature applications, and to bearings for reducing friction and wear between moving surfaces wherein a fluid is conducted to the bearing surfaces.

The trend in modern engine design has been toward higher and higher operating temperatures. In an engine operating at extremely high temperatures it is necessary to provide for unequal expansions that may occur in the bearing and the revolving member, such as a shaft. Large temperature gradients are almost certain to exist and thus the revolving member, hereinafter referred to in the description and claims as the shaft, may expand to a point where it will become jammed inside the bearing housing, thus seriously impairing operation and causing damage to the engine. Most bearings presently in use make no suitable provision for expansion of parts over wide temperature ranges. At these high temperatures ordinary lubricants char, burn or otherwise change their chemical compositions in a manner that may result in serious damage to the engine. The use of a fluid as the wear and friction reducing means, which remains liquid over the operating temperature range, is a solution. My invention is directed to a bearing construction and arrangement which will utilize such a fluid and thus eliminate many of the problems of prior art devices when subjected to high temperature operation.

One object of my invention is to provide an improved construction and arrangement for bearings wherein the moving parts are prevented from rubbing or directly engaging each other without the use of ordinary lubricants.

Another important object of my invention is to provide an improved construction and arrangement for bearings which will accommodate unequal expansions that occur in the moving parts at high temperature operation.

Another important object of my invention is to provide an improved bearing construction which will pump the introduced fluid therethrough in relatively small units resembling ball or roller bearings.

This is accomplished according to my invention by the provisioin of means for conducting fluid to at least one spiral groove provided in each of the mating surfaces of a shaft and a bearing in which the shaft is journaled. The fluid, which remains in fluid state under operating conditions, may preferably be molten gallium or other non-viscous fluids, such as mercury, molten solder and lead, or any other kind of similar fluid or alloys thereof adapted to reduce wear and friction. The fluid being forced into the spiral grooves and the rotation of the shaft relative to the bearing produces a pumping action on the fluid, and the fluid is broken into small ball-like units which function in a manner similar to ball or roller bearings to maintain an annular clearance between the bearing surface and the shaft, thereby holding the shaft in a floating state.

The bearing according to my invention is one preferably having a bearing surface which is tapered and the shaft is provided with a matching taper. The surface of the shaft and the bearing are provided with spiral grooves of like or opposite hand. Where the grooves are of the same hand, it is preferable that they be of a different pitch. Fluid of the type described is conducted to these grooves continuously and at substantially uniform pressure through lines or conduits communicating with the grooves. With this arrangement the fluid prevents the rotary member or shaft from forming a metal-to-metal contact with the bearing surface.

Other objects and advantages of the invention will become apparent upon considering the following detailed description in conjunction with the drawing wherein one typical embodiment of the invention is illustrated and wherein:

Figure 1 shows a double bearing arrangement embodying my invention;

Figure 2 is a sectional view of the bearing structure at one end of the shaft; and Figure 3 is a sectional view similar to that of Figure 2 but of the bearing structure at the opposite end of the shaft.

In the arrangement of Figures 1, 2 and 3 there is illustrated my improved bearing structure in connection with a high speed rotating shaft exposed to high temperatures and, of course, it is to be understood that such is merely representative of an application of the present invention. The shaft 10 is provided at each end with a tapered section 11 and 12, both being tapered in a common direction. Suitable bearing blocks 13 and 14 are provided with tapered surfaces 17 and 18 maching the tapers 11 and 12 on shaft 10. The tapers on shaft 10 are each provided with at least one spiral or helical groove 15 and 16 which may be either right hand or left hand. The tapered surfaces 17 and 18 of bearings 13 and 14 are each provided with at least one spiral groove 19 and 20 which may be of opposite hand, as shown, to that of the mating tapered surface of the shaft 10 or if of the same hand, of different pitch.

For simplicity and clarity, only one spiral groove is being illustrated as provided in each bearing surface 17 and 18 and in each tapered surface 11 and 12. However, preferably a plurality of such grooves in each surface, properly spaced from one another, will be included as such results in a much greater number of ball-like fluid units for supporting the shaft in its floating state. Referring to grooves 15, 16, 19 and 20 again, the object is to cause fluid of the type described to be continuously circulated therein from adjacent the high point of the tapers to adjacent the low point of the tapers 11, 12, 17 and 18. During this circulation of the two streams in each bearing caused by fluid pressure, the tapers, grooves and shaft rotation, there will be a plurality of fluid crossings, depending upon the number, spacing, hand and pitch of grooves 15 and 19 or grooves 16 and 20. It is at these crosses that fluid bubbles or ball-like units are formed, such functioning to support the shaft 10 and maintain clearance C and C' between surfaces 11 and 17 and 12 and 18. The liquid or fluid crossings as well as the surface tension of the liquid itself result in the formation of the liquid balls. Obviously, the more fluid bubbles the better the objects of this invention are fulfilled and this is the reason for stating that preferably each surface 11, 12, 17 and 18 would be provided with a multiplicity of grooves.

Bearing in mind that only one groove has been shown on each surface 11, 17, 12 and 18, numeral P represents a suitable pumping means for continuously circulating the fluid through inlet lines 21 and 22 and recirculating fluid from return line 23. Fluid transporting or inlet lines 21 and 22 extend into and through bearing housings 13 and 14 respectively, and communicate respectively, with enlarged areas 24 and 25 which in turn respectively communicate and mate with relieved areas 26 and 27 provided in the tips of shaft 10. Extending axially through taper section 11 is a fluid transporting conduit 28 which in turn communicates with a radially extending conduit 29, the latter communicating with the beginning of groove 15 at the high side of taper 11. In flow relationship with groove 19 at the commencement thereof is a fluid conduit 30 which communicates with inlet line 21 and groove 19. In connection with groove 16, it also communicates at the high side of taper 12 with radial line 31, which in turn is in fluid flow relationship with area 27. Also, line 32 results in fluid being conducted to groove 20. Lines 30 and 32, respectively, communicate with grooves 19 and 20 at the high side of the tapers and at the beginning of one end of the grooves.

At the lower points of tapers 11 and 12 the grooves 15 and 19, as well as grooves 16 and 20, terminate in ring-like or annular mating grooves 33 and 34 and 35 and 36, the latter of each set communicating with return lines 37 and 38, the latter in turn being in fluid flow relationship with duct 23. To prevent any short circuiting of fluid, such as molten metal gallium or the like, suitable packing 39 is provided, the latter being of any suitable resilient and flexible material permitting relative rotation of the shaft and bearing housings without leakage of fluid.

Assuming C and C' represent the clearances between taper 11 and surface 17 and taper 12 and surface 18 in exaggerated fashion, it must be kept in mind that the fluid lines or conduits 21, 22, 28, 29, 30, 31 and 32 as well as return lines 37 and 38 are much larger, whereby the fluid takes the path of least resistance and continuously travels in the direction of the arrows of Figure 1. The combined pumping action of grooves 15 and 16 in the tapered portions of shaft 10 and grooves 19 and 20 in surfaces 17 and 18 of bearings 13 and 14 move the fluid from the larger ends of the tapers to the annular terminals at the smaller ends and, of course, the tapers and pump P enter into this uniform pumping action and circulation. As a result of the fluid paths crossing, the fluid breaks up into small bubble-like units which act in the manner of roller or ball bearings to maintain the spacing between the shaft and the bearing blocks.

It will be readily understood that with the introduction of a fluid into the bearings at a given pressure, with a given load on shaft 10, that a relatively constant spacing C and C' between the bearing surfaces and shaft will be maintained. Where there is an expansion of parts upsetting this balance the shaft is permitted to move in a direction to re-establish the original spacing. In Figure 1 this movement will be to the right or toward the larger end of the tapers.

Figures 2 and 3 show views of the bearing blocks 13 and 14 illustrating the forming of the spiral grooves 19 and 20. The bearing blocks 13 and 14, respectively, are shown to include spiral grooves 19 and 20 of opposite hand of the grooves 15 and 16 of the shaft in Figure 1. As previously indicated, these may be of the same hand if of different pitch and the rotation of the shaft 10 is such to produce pumping of the fluid from the larger to the smaller end of the tapers.

While several fluids suggest themselves as being suitable for use in the bearing of this invention, the metal gallium and alloys thereof appear to be particularly suited because of the large range of temperatures over which gallium remains in the liquid state. Gallium metal has a melting point of 29.7° C. and remains a liquid up to 1983° C., which is the boiling point.

While there have been described what at present are considered to be the preferred embodiments of my invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A bearing comprising an axially tapered bearing housing including a bearing surface having at least one groove in the form of a continuous spiral extending along the periphery thereof, a shaft portion mating with the bearing surface having in its peripheral surface at least one continuous spiral groove extending in a direction to cross the path of travel of the groove in the bearing surface at selected spaced intervals therealong, and a fluid conducted under pressure along the grooves in the direction of taper of the mating portions being divisible into a series of ball-like fluid bearing units at the points of crossing of the grooves to maintain an annular clearance between said shaft and bearing surface.

2. The combination of claim 1 wherein the spiral groove in the bearing housing and in the mating surface of the shaft are of opposite hand.

3. The combination of claim 1 wherein the spiral groove in the bearing housing and in the mating surface of the shaft are of the same hand and of different pitch.

4. The combination as set forth in claim 1 wherein the fluid is conducted to the grooves adjacent the high points of the tapers.

5. The combination as defined in claim 1 wherein the conducting means includes an inlet conduit in said bearing housing and there is provided means for continuously discharging the fluid from the grooves adjacent the low points of the tapers.

6. The combination as set forth in claim 1 including a plurality of bearing housings and shaft mating surfaces wherein each of the bearing and shaft surfaces are tapered in the same direction.

7. A bearing comprising, in combination, a pair of opposed bearing housings each including an axially tapered bearing surface, a shaft including an axially tapered shaft surface mating with each of said bearing surfaces, said mating shaft and bearing surfaces being tapered in the same direction to provide for relative movement between said shaft surfaces upon expansion to maintain the original spacing therebetween, each of said mating shaft and bearing surfaces being provided with crossed spiral grooving thereon, means for conducting a liquid through said grooving in the direction of taper of said mating surfaces and with said liquid being divisible into a series of ball-like liquid bearing units operative to maintain an annular clearance between said shaft surfaces and the respective bearing surfaces.

References Cited in the file of this patent

UNITED STATES PATENTS

| Re. 20,026 | Thoma | June 30, 1936 |
| 551,853 | Desgoffe | Dec. 24, 1895 |
| 626,715 | Norton | June 13, 1899 |
| 2,711,934 | Rickenmann | June 28, 1955 |